United States Patent [19]

Goldenberg et al.

[11] Patent Number: 5,210,111
[45] Date of Patent: May 11, 1993

[54] CROSSLINKED HYDROGELS DERIVED FROM HYDROPHILIC POLYMER BACKBONES

[75] Inventors: Merrill S. Goldenberg, Teaneck, N.J.; Ellen Rennwantz, N. Tarrytown, N.Y.

[73] Assignee: Ciba-Geigy Corporation, Ardsley, N.Y.

[21] Appl. No.: 748,578

[22] Filed: Aug. 22, 1991

[51] Int. Cl.$^5$ .............................................. C08F 271/02
[52] U.S. Cl. ..................... 523/108; 523/106; 525/278; 525/293
[58] Field of Search ................ 525/278, 293; 523/106, 523/108

[56] References Cited

U.S. PATENT DOCUMENTS

| | | | |
|---|---|---|---|
| 3,408,429 | 10/1968 | Wichterle | 264/2.1 |
| 3,639,524 | 2/1972 | Seldermon | 525/263 |
| 3,776,889 | 12/1973 | Pande et al. | 525/59 |
| 3,841,985 | 10/1974 | O'Driscoll et al. | 525/283 |
| 3,928,299 | 12/1975 | Rosenkranz et al. | 525/293 |
| 3,929,741 | 12/1975 | Laskey | 523/106 |
| 3,985,697 | 10/1976 | Urbach | 523/106 |
| 4,085,168 | 4/1978 | Milkovich et al. | 525/59 |
| 4,347,198 | 8/1982 | Ohkada et al. | 264/2.3 |
| 4,426,492 | 1/1984 | Steckler | 525/61 |
| 4,433,179 | 2/1984 | Lohse et al. | 568/663 |
| 4,528,317 | 7/1985 | Theodore et al. | 525/278 |
| 4,614,761 | 9/1986 | Takiyama et al. | 525/293 |
| 4,665,123 | 5/1987 | Goldenberg | 525/59 |
| 4,670,506 | 6/1987 | Goldenberg | 525/59 |
| 4,720,187 | 1/1988 | Goldenberg | 351/160 |
| 4,929,692 | 5/1990 | Goldenberg | 526/247 |
| 4,933,408 | 6/1990 | Goldenberg | 526/247 |
| 4,978,713 | 12/1990 | Goldenberg | 525/61 |
| 5,039,769 | 8/1991 | Molock | 526/301 |

FOREIGN PATENT DOCUMENTS

| | | |
|---|---|---|
| 0263061 | 4/1988 | European Pat. Off. . |
| 0330614 | 8/1989 | European Pat. Off. . |
| 0331633 | 9/1989 | European Pat. Off. . |
| 2528068 | 1/1976 | Fed. Rep. of Germany . |
| 50-144793 | 11/1975 | Japan . |

*Primary Examiner*—James J. Seidleck
*Assistant Examiner*—Thomas Hamilton, III
*Attorney, Agent, or Firm*—Luther A. R. Hall; William G. Hervey

[57] ABSTRACT

The crosslinked polymerization product of the reaction product of a polymeric backbone containing pendant hydroxyl groups with an unsaturated monoisocyanate or of said reaction product with an ethylenically unsaturated monomer gives a hydrogel material suitable for making contact lenses.

1 Claim, No Drawings

CROSSLINKED HYDROGELS DERIVED FROM HYDROPHILIC POLYMER BACKBONES

The instant invention pertains to hydrogels which are the polymerization product of the reaction product of a polymeric backbone containing pendant hydroxyl groups with an unsaturated monoisocyanate or of said reaaction product with an unsaturated monomer. These hydrogels are suitable for the preparation of contact lenses.

BACKGROUND OF THE INVENTION

In general, most existing hydrogel soft contact lens materials are based on HEMA, also known as hydroxyethyl methacrylate or as ethyleneglycol monomethacrylate, with one or more optional comonomers as described in U.S. Pat. Nos. 2,976,576, 3,841,985 and 3,985,697. Other hydrogels based on N-vinylpyrrolidone copolymers and acrylamide copolymers are disclosed in U.S. Pat. Nos. 3,639,524 and 3,929,741. These prior hydrogel polymers generally suffer from several inherent problems (a) relatively weak mechanical strength, low dissolved oxygen permeability or a combination of both (b) most lenses are made by either of two procedures, one requiring costly lathing and polishing steps and the other using delicate spin casting techniques where polymerization, crosslinking, and shaping are done simultaneously.

Polyvinyl alcohol has also been proposed as contact lens material. Several reagents have been suggested to crosslink PVA for this purpose: formalin and acid catalysis, Japanese Pat. No. 72/06910; dialdehyde of PVA with PVA and acid catalysis, Japanese Patent application No. 50/115258; and glyoxal, U.S. Pat. No. 3,408,429. These PVA crosslinked materials suffer from hydrolyzable acetal or hemiacetal linkages.

Silberman and Kohn, ACS Polymer Preprints 24, 262-3, 465-6 (1983) and J. Polym. Sci. Chem. 23, 327-336 (1985) prepared 2-benzyloxyethyl-methacrylate (BzOEMA) and graft polymerized it onto PVA by anionic and free radical catalysis. Membranes for contact lens applications were prepared by dissolving the PVA-graft-BzOEMA in dimethylsulfoxide, casting it on a Teflon surface and immersing it in acetone to precipitate a film which is later swollen in water. However such graft polymerization is generally accompanied by oxidation and degradation of the PVA and by the orientation effects in the casting procedure thereby promoting anisotropy in the mechanical properties.

Grafted PVAs have also been made by procedures that do not involve the formation of a radical on a polymer backbone. For example:

In U.S. Pat. No. 4,085,168 (1978) a PVA-graft copolymer useful as a hydrogel contact lens is made by first forming a hydrophobic macromer, such as polystyrene or polymethylmethacrylate, by an anionic mechanism and capping with a polymerizable (meth)acrylate group. This macromer is then copolymerized free radically with vinyl acetate. After hydrolysis of the acetate group a comb-like structure with a PVA backbone and pendant hydrophobic chains of similar molecular weight is produced. Though clear, transparent films can be produced by this method, the actual chemistry involves several complicated steps some of which require moisture sensitive precautions.

Also in U.S. Pat. No. 4,426,492 (1984) certain carboxylated PVA derivatives, useful as disposable, hydrogel soft contact lenses, are disclosed. It is broadly disclosed that certain carboxylated PVA derivatives may be internally plasticized by esterification with a polyglycolether such as poly(ethyleneglycol). However, esterification reactions are normally difficult to be precisely reproduced, and, in addition, mixing problems may be experienced due to phase separation of two high molecular weight polymers.

PVA has been reacted with isocyanates forming urethane linkages, for example:

In U.S. Pat. No. 3,776,889 (1973) PVA has been fully reacted with allylisocyanate for use in a photoresist printing plate composition. In U.S. Pat. No. 3,928,299 (1975), isocyanatoethyl methacrylate (IEM) was reacted with certain hydroxyalkyl methacrylate containing polymers forming a urethane linkage and the polymer used in relief printing plates or circuits to form hard, insoluble coatings.

In U.S. Pat. Nos. 4,665,123 (1987) and 4,670,506 (1987) are described polyvinyl alcohol derivatives containing pendant (meth)acryloyl units bound to the polyvinyl alcohol backbone, through urethane groups, which in the case of the former patent are further reacted with a conventional vinylic monomer, and which can be crosslinked to form soft hydrogel lenses.

PVA with ether linkages have been made, for example:

In U.S. Pat. No. 4,433,179 (1984) is described a process for the preparation of poly-allyl ethers of high degree of allylation by derivatizing polyhydroxy compounds with allyl halides under phase transfer catalysis conditions. PVA of molecular weights 2,000 and 14,000 are exemplified as being derivatized with 78% and 62% of the maximum theoretical number of double bonds.

In the European patent application EP-177296-A (1986) is described a process for the production of water-soluble unsaturated polymerizable methylol acrylamide derivatives of polyols. It is exemplified to form a poly (vinyl alcohol) with 49% of the hydroxy groups of the polymer substituted with acrylamidomethyl groups. However, no suggestion of contact lenses is taught or suggested.

In U.S. Pat. No. Re. 27,401 (1972) Wichterle and Lim prepared a PVA-methacrylate i.e. a PVA that was esterified 1% with methacrylic acid anhydride, dissolved the same to make a 25% aqueous solution, and polymerized the mixture in a flat mold using potassium persulfate and sodium thiosulfate as initiator to form a hydrogel membrane. This type of hydrogel was disclosed for contact lens use. However, such lenses tend to be fragile.

Also in U.S. Pat. No. 4,347,198 (1982) it is disclosed to mix a hydrophilic component, e.g. N-vinyl pyrrolidone, a hydrophobic component, e.g. methyl methacrylate, crosslinking agent and initiator in a solvent, e.g. dimethyl sulfoxide and crosslink the whole mixture in a mold. After equilibration in water a soft hydrogel contact lens is produced. Similarly a lens is disclosed as produced by mixing a polymethylmethacrylate with pendant vinyl groups with N-vinyl pyrrolidone and polymerizing the mixture. It is also broadly disclosed to use a PVA esterified with methacrylic acid as the hydrophilic component of a contact lens mixture.

U.S. Pat. No. 4,978,713 describes polyvinyl alcohol ether derivatives containing (meth)acryloyl units, which are optionally further reacted with a conventional vinylic monomer, and which then can be crosslinked to form a soft water-swellable hydrogel contact lens having high mechanical strength, medium to high water content, superior optical clarity and high oxygen permeability.

Japanese Sho 50-144793 describes a hydrophilic polymer containing pendant polymerizable double bond groups copolymerized with a second hydrophilic monomer to give a novel hydrophilic copolymer which can be used for biomedical devices inter alia contact lenses. The emphasis in this reference is on hydrophilicity and for the need of a second hydrophilic monomer as a necessary component in the final polymers.

DETAILED DISCLOSURE

The instant invention pertains to crosslinked, substantially transparent hydrogels which are suitable for making a contact lens. More particularly, said hydrogels may be described as follow:

A crosslinked, substantially transparent hydrogel, suitable for making a contact lens, which is the homopolymerization product of (a) a precursor polymer or copolymer containing two or more pendant or terminal hydroxyl groups, said precursor polymer or copolymer being the polymerization product of (1) one or more ethylenically unsaturated monomers the major amount of which must be hydrophilic;

reacted with (2) one or more monoisocyanates where at least one of the monoisocyanates must contain an ethylenically unsaturated moiety;

with the proviso that the hydrogel has a percent water content of at least 15%.

More particularly, said hydrogel is the homopolymerization product of (a) a precursor polymer or copolymer containing two or more pendant or terminal hydroxyl groups, said precursor polymer or copolymer being the polymerization product of (1) one or more ethylenically unsaturated monomers selected from the group consisting of 2-hydroxyethyl methacrylate, N-vinyl-2-pyrrolidone, N,N-dimethylacrylamide, 2-ethylhexyl acrylate, cyclohexyl methacrylate, 2-hydroxypropyl methacrylate, isobornyl methacrylate, methyl methacrylate, styrene and allyl alcohol;

reacted with (2) one or more monoisocyanates selected from the group consisting of 2-isocyanatoethyl methacrylate, styrene isocyanate, cyclohexyl isocyanate, m-isopropenyl-α,α-dimethylbenzyl isocyanate and phenyl isocyanate where at least one of the monoisocyanates must contain an ethylenically unsaturated moiety;

with the proviso that the hydrogel has a percent water content of at least 15%.

The instant invention is also drawn to a wettable, clear, oxygen permeable contact lens prepared from either hydrogel described above.

The instant invention is also drawn to a crosslinked, substantially transparent hydrogel, suitable for making a contact lens, which is the copolymerization product of (a) a precursor polymer or copolymer containing two or more pendant or terminal hydroxyl groups, said precursor polymer or copolymer being the polymerization product of (1) one or more ethylenically unsaturated monomers the major amount of which must be hydrophilic;

reacted with (2) one or more monoisocyanates where at least one of the monoisocyanates must contain an ethylenically unsaturated moiety; and (b) an ethylenically unsaturated monomer or mixture thereof chosen to assure that the hydrogel has a percent water content of at least 15%.

More particularly, the instant invention is to a hydrogel which is the copolymerization product of (a) a precursor polymer or copolymer containing two or more pendant or terminal hydroxyl groups, said precursor polymer or copolymer being the polymerization product of (1) one or more ethylenically unsaturated monomers selected from the group consisting of 2-hydroxyethyl methacrylate, N-vinyl-2-pyrrolidone, N,N-dimethylacrylamide, 2-ethylhexyl acrylate, cyclohexyl methacrylate, 2-hydroxypropyl methacrylate, isobornyl methacrylate, methyl methacrylate, styrene and allyl alcohol;

reacted with (2) one or more monoisocyanates selected from the group consisting of 2-isocyanatoethyl methacrylate, styrene isocyanate, cyclohexyl isocyanate, m-isopropenyl-α,α-dimethylbenzyl isocyanate and phenyl isocyanate where at least one of the monoisocyanates must contain an ethylenically unsaturated moiety; and (b) an ethylenically unsaturated monomer or mixture thereof chosen to assure that the hydrogel has a percent water content of at least 15%.

The instant invention is also drawn to a wettable, clear, oxygen permeable contact lens prepared from either of the hydrogels described supra.

Another aspect of the instant invention is to a crosslinked, substantially transparent hydrogel, suitable for making a contact lens, which is the homopolymerization product of a derivative of (1) a polyvinyl alcohol having a weight average molecular weight of at least 2000, containing an effective amount between 0.1 and 90 percent, based on the number of hydroxyl groups on said polyvinyl alcohol of the reaction product said polyvinyl alcohol reacted with (2) two or more monoisocyanates where one of the monoisocyanates must contain an ethylenically unsaturated moiety and the other monoisocyanate is a hydrophobic monoisocyanate;

with the proviso that the hydrogel has a percent water content of at least 15%.

More particularly, the instant invention is a hydrogel which is the homopolymerization product of a derivative of (1) a polyvinyl alcohol having a weight average molecular weight of at least 2000, containing an effective amount between 0.1 and 90 percent, based on the number of hydroxyl groups on said polyvinyl alcohol of the reaction product said polyvinyl alcohol reacted with (2) two or more monoisocyanates selected from the group consisting of 2-isocyanatoethyl methacrylate, styrene isocyanate, cyclohexyl isocyanate, m-isopropenyl-α,α-dimethylbenzyl isocyanate and phenyl isocyanate where one of the monoisocyanates must contain an ethylenically unsaturated moiety and the other monoisocyanate is a hydrophobic monoisocyanate;

with the proviso that the hydrogel has a percent water content of at least 15%.

Another aspect of the instant invention is to a wettable, clear, oxygen permeable contact lens prepared from either of the hydrogels described above.

Still another aspect of the instant invention is to a crosslinked, substantially transparent hydrogel, suitable for making a contact lens, which is the copolymerization product of a derivative of (1) a polyvinyl alcohol having a weight average molecular weight of at least 2000, containing an effective amount between 0.1 and 90 percent, based on the number of hydroxyl groups on said polyvinyl alcohol of the reaction product said polyvinyl alcohol reacted with (2) two or more monoisocyanates where one of the monoisocyanates must contain an ethylenically unsaturated moiety and the other monoisocyanate is a hydrophobic monoisocyanate;

(b) an ethylenically unsaturated monomer or mixture thereof chosen to assure that the hydrogel has a percent water content of at least 15%.

More particularly, the instant invention is to a hydrogel which is the copolymerization product of a derivative of (1) a polyvinyl alcohol having a weight average molecular weight of at least 2000, containing an effective amount between 0.1 and 90 percent, based on the number of hydroxyl groups on said polyvinyl alcohol of the reaction product said polyvinyl alcohol reacted with (2) two or more monoisocyanates selected from the group consisting of 2-isocyanatoethyl methacrylate, styrene isocyanate, cyclohexyl isocyanate, m-isopropenyl-α,α-dimethylbenzyl isocyanate and phenyl isocyanate where one of the monoisocyanates must contain an ethylenically unsaturated moiety and the other monoisocyanate is a hydrophobic monoisocyanate;

(b) an ethylenically unsaturated monomer or mixture thereof chosen to assure that the hydrogel has a percent water content of at least 15%.

Another aspect of the instant invention is to a wettable, clear, oxygen permeable contact lens prepared from the hydrogels described supra.

The monomers required to make the backbone precursor polymers of this invention having pendant or terminal hydroxyl groups are items of commerce. Such precursor polymers are made by conventional addition polymerization using free radical catalysts such as the peroxide, hydroperoxide or azo catalysts. In many cases, the polymers themselves are available commercially. This is particularly true of poly(vinyl alcohol) as is described in U.S. Pat. No. 4,978,713 the pertinent parts of which are incorporated herein by reference.

In like manner the monoisocyanates such as 2-isocyanatoethyl methacrylate are also items of commerce. Additionally, the vinylic monomers used to copolymerize with the isocyanate modified precursor polymers are also items of commerce.

The reaction between the precursor polymer and the monoisocyanate is carried out at a temperature between $-10°$ C. and $100°$ C. in the presence of an aprotic solvent in the presence or absence of a catalystic amount of a urethane forming catalyst.

Suitable aprotic solvents include formamide, N,N-dimethylformamide, N,N-dimethylacetamide, N-methyl-2-pyrrolidone, acetamide, acetonitrile, hexamethylphosphoramide and preferably dimethyl sulfoxide.

Suitable urethane forming catalysts include tertiary amines, such as trimethylamine, triethylamine, N,N-dimethylbenzylamine, or an organo metallic catalyst, such as stannous octoate or dibutyl dilaurate, or sodium acetate.

The guiding parameter of the instant invention is the physical character of the hydrogel formed. The overriding goal is to form a hydrogel which provides the proper amount of hydrophilicity (a percent water content of at least 15%), adequate oxygen permeability and good mechanical strength. Since the hydrophilicity of the precursor polymer backbone can be adjusted by the choice of monomers making it up, the nature of the vinylic monomers to be used to copolymerize with the precursor polymer modified with a monoisocyanate can also be varied between hydrophilic and hydrophobic vinylic monomers depending on the level of hydrophilicity required in the final hydrogel.

An important property of hydrogels used to make contact lenses is their mechanical strength and dimensional stability since optical properties are critical. When the instant materials are placed in a mold for polymerization and preparation of a contact lens, no contraction of the polymerization mass is observed. Thus the material after polymerization conforms to the dimensions of the mold precisely allowing for a facile process for making contact lenses of any desired contours.

The polymerizable vinylic monomer may be hydrophilic, hydrophobic or may be a mixture of hydrophilic and hydrophobic vinylic monomers. Suitable vinylic monomers include those conventional vinylic monomers generally employed in the fabrication of soft and hard contact lenses. By a hydrophilic vinylic monomer is meant a monomer which, when polymerized by conventional free radical polymerization, characteristically yields a polymer which either dissolves in water or is capable of absorbing at least 10% by weight water under ambient equilibrium conditions. Similarly, suitable hydrophobic vinylic monomers are those monomers which, when polymerized by conventional free radical polymerization, characteristically yield a polymer which neither dissolves in water, nor is capable of absorbing at least 10% by weight under ambient (i.e. $20°$ C.) equilibrium conditions.

Suitable vinylic monomers for polymerization include conventional hydrophobic and hydrophilic monomers. Suitable hydrophobic monomers include, without limitation, $C_1$ to $C_{18}$ alkyl acylates and methacrylate, $C_3$ to $C_{18}$ alkyl acylamides and methacrylate, $C_3$ to $C_{18}$ alkylacrylamides and methacrylamides, acrylonitrile, methacrylonitrile, vinyl $C_1$ to $C_{18}$ alkanoates, $C_2$ to $C_{18}$ alkenes, $C_2$ to $C_{18}$ haloalkenes, styrene, $C_1$ to $C_6$ alkyl styrenes, vinyl alkyl ethers wherein the alkyl portion has 1 to 6 carbon atoms, $C_3$–$C_{12}$ perfluoroalkyl ethyl thiocarbonylaminoethyl acrylates and methacrylates, $C_3$–$C_{12}$ fluoroalkyl acrylates and methacrylates, acryloxy and methacryloxy alkyl siloxanes, N-vinyl carbazole, $C_1$–$C_{12}$ alkyl esters of maleic, fumaric, itaconic, and mesaconic acids and the like. Examples of suitable hydrophobic monomers include methyl acrylate, ethyl acrylate, propyl acrylate, isopropyl acrylate, cyclohexyl acrylate, 2-ethylhexyl acrylate, methyl methacrylate, propyl methacrylate, vinyl acetate, vinyl propionate, vinyl butyrate, vinyl valerate, styrene, chloroprene, vinyl chloride, vinylidine chloride, acrylonitrile, 1-butene, butadiene, methacrylonitrile, vinyl toluene, vinyl ethyl ether, perfluorohexylethylthiocarbonylaminoethyl methacrylate, isobornyl methacrylate, hexafluorobutyl methacrylate, 3-methacryloxypropylpentamethyldisiloxane, and bis(methacryloxypropyl) tetramethyldisiloxane.

Suitable hydrophilic monomers include, without limitation, hydroxy substituted lower alkyl acrylates and methacrylates, acrylamide, methacrylamide, $C_1$–$C_2$ lower alkyl acrylamide and methacrylamide, ethoxylated acrylates and methacrylates, hydroxy substituted lower alkyl acrylamide and methacrylamide, hydroxy substituted lower alkyl vinyl ethers, sodium ethylene sulfonate, sodium styrene sulfonate, 2-acrylamido-2-methylpropanesulfonic acid, N-vinylpyrrole, N-vinylsuccinimide, N-vinyl pyrrolidone, 2-and 4-vinyl pyridine, acrylic acid, methacrylic acid, amino (by amino including quaternary ammonium), monoloweralkylamino- or diloweralkylamino-lower alkyl acrylates or methacrylates, allyl alcohol, and the like.

Specific hydrophilic monomers include hydroxyethyl methacrylate, hydroxyethyl acrylate, acrylamide, methacrylamide, N,N-dimethylacrylamide, allyl alcohol, vinyl pyridine, vinyl pyrrolidone, glycerol methacrylate, N-(1,1-dimethyl-3-oxobutyl) acrylamide, and the like.

Preferred hydrophobic monomers are methyl methacrylate and vinyl acetate.

Preferred hydrophilic monomers are 2-hydroxyethyl methacrylate, N-vinyl-2-pyrrolidone, acrylamide, and N,N-dimethylacrylamide.

Vinyl unsaturated isocyanates include 2-isocyanatoethyl methacrylate, 2-isocyanatoethyl acrylate, 3-isocyanatopropyl methacrylate, 1-methyl-2-isocyanatoethyl methacrylate, and 1,1-dimethyl-2-isocyanatoethyl acrylate.

Such compounds and their preparation are disclosed, for example, in U.S Pat. No. 2,718,516 and British Patent No. 1,252,099.

Other useful isocyanates include isocyanatoalkyl vinyl ethers, such as 2-isocyanatobutyl vinyl ether, and styrene isocyanate and m-isopropenyl-alpha,alpha-dimethylbenzyl isocyanate. Also useful are isocyanates obtained by the reaction of one mole of a hydroxy- or aminoalkyl acrylate or methacrylate with one mole of a diisocyanate. Examples of useful such acrylates and methacrylates include 2-hydroxyethyl methacrylate, 2-hydroxyethyl acrylate, 3-hydroxypropyl methacrylate, or t-butylaminoethyl methacrylates; suitable diisocyanates include isophorone diisocyanate, (3,3,4)-trimethylhexane-1,6-diisocyanate, toluene diisocyanate, diphenylmethane-4,4'-diisocyanate and the like.

Most preferred are 2-isocyanatoethyl methacrylate and m-isopropenyl-α,α-dimethylbenzyl isocyanate.

Hydrophobic monoisocyanates of use in the instant invention include phenyl isocyanate, cyclohexyl isocyanate, benzyl isocyanate, p-tolyl isocyanate, m-tolyl isocyanate and n-octadecyl isocyanate; preferably phenyl isocyanate and cyclohexyl isocyanate.

The precursor polymer containing pendant or terminal hydroxyl groups is preferably derived from at least 40 mol percent of hydrophilic monomers.

Preferably the modified polyvinyl alcohol has at least 50 mol percent of the hydroxyl groups still present as OH groups and where at least 50 mol percent of the hydroxyl groups reacted with a monoisocyanate are reacted with a hydrophobic monoisocyanate such as phenyl isocyanate or cyclohexyl isocyanate.

Polyvinyl alcohols are widely available.

Preferably, the polyvinyl alcohol has a weight average molecular weight of at least 10,000.

As an upper limit, the polyvinyl alcohol may have a weight average molecular weight of up to 1,000,000. Preferably, the polyvinyl alcohol has a weight average molecular weight of up to 300,000, more preferably up to 100,000, most preferably up to 50,000.

Ordinarily, polyvinyl alcohol predominately possesses a poly(2-hydroxy)ethylene structure. However, the polyvinyl alcohol starting material may also contain hydroxyl groups in the form of 1,2-glycols, such as copolymer units of 1,2-dihydroxyethylene in the chain, obtained for example, by alkaline hydrolysis of vinyl acetate-vinylene carbonate copolymers.

Moreover, the polyvinyl alcohol may contain minor amounts of copolymer units of ethylene, propylene, acrylamide, methacrylamide, dimethylacrylamide, hydroxyethyl methacrylate, methyl methacrylate, methyl acrylate, ethyl acrylate, vinyl pyrrolidone, hydroxyethyl acrylate, allyl alcohol, styrene and the like.

Commercial polyvinyl alcohol resin may be used such as Vinol ® 107 manufactured by Air Products (MW=22-31,00, 98-98.8% hydrolyzed). Polysciences 4397 (MW=25,000, 98.5% hydrolyzed), BF 14 by Chan Chun, Elvanol ® 90-50 by Du Pont, UF-120 by Unitika, Mowiol ® 10-98 and 20-98 by Hoechst. Some other manufacturers are Nippon Gohsei (Gohsenol ®), Monsanto (Gelvatol ®), Wacker (Polyviol ®) as well as Japanese manufacturers Kuraray, Denki and Shin-Etsu.

As noted above, copolymers of hydrolyzed vinyl acetate can be used and are commercially available such as hydrolyzed ethylene vinyl acetate (EVA), vinyl chloride-vinylacetate, N-vinyl pyrrolidone-vinyl acetate and maleic anhydride-vinyl acetate.

Polyvinyl alcohol is ordinarily prepared by hydrolysis of the corresponding homopolymeric polyvinyl acetate. In a preferred embodiment the polyvinyl alcohol contains less than 50% polyvinyl acetate units, more preferably less than 20% polyvinyl acetate units.

One method of roughly estimating the weight average molecular weight of polyvinyl alcohol is by the viscosity of a 4% aqueous solution at 20° C.: for example a viscosity of 1-2 cP corresponds to a molecular weight of ~3,000, a viscosity of 7 cP corresponds to a molecular weight of ~25,000 (98-100% hydrolyzed) while a viscosity of 60 cP corresponds to a molecular weight of ~130,000 (99-100% hydrolyzed). Preferably the polyvinyl alcohol should have a minimum viscosity of 2 cP and the upper limit of molecular weight is dictated by the ability to stir and pour solutions without introduction of air bubbles - this value is approximately 60-70 cP. It is important to note that the manufacturers' claim of molecular weight (based on viscosity data) does not necessarily correspond to that obtained by gel permeation chromatography (GPC) which is dependent on the standards used. In Table 1 are presented a range of polyvinyl alcohols and the GPC results determined using polyacrylamide standards in aqueous solution.

The weight average molecular weight ranges specified in this disclosure are those obtained by GPC using polyethylene oxide standards in DMSO or the manufacturer's specified molecular weight.

TABLE 1

| PVA MOLECULAR WEIGHT COMPARISON | | |
|---|---|---|
| | Manufacturers' Claimed | |
| Manufacturer | $M_W$ | Viscosity, CPS* | GPC, $M_W$ |
| Polysciences | 133,000 | — | 66,000 |
| Scientific Polymer Products | 126,000 | 60 | 45,000 |
| Scientific Polymer Products | 115,000 | — | 69,000 |
| Shin-Etsu Poval C25 | 110,000 | 65 ± 5 | 38,000 |
| Air Products Vinol 350 | 106–110,000 | 55–65 | 43,000 |
| Hoechst, Moviol 66-100 | 100,000+ | 66 ± 4 | 26,000 |
| DuPont, Elvanol HV | 100,000+ | 55–65 | 50,000 |
| Polysciences | 78,000 | 28–32 | 37,000 |
| Sigma | 45,000 | 12–14 | 30,000 |
| Polysciences | 25,000 | 6–8 | 20,000 |
| Aldrich | 14,000 | — | 33,000 |
| Scientific Polymer Products | 14,000 | — | 22,000 |

*4% aqueous solutions at 20° C.

Polymerization of the precursor polymer or modified polyvinyl alcohol optionally with a vinyl monomer or mixture thereof may be carried out by employing initiators which generate free-radicals on application of an activating energy as is conventionally used in the polymerization of ethylenically unsaturated monomers. Included among free-radical initiators are the conventional thermally activated initiators such as organic peroxides and organic hydroperoxides. Representative examples of such initiators include benzoyl peroxide, tertiary-butyl perbenzoate, diisopropyl peroxydicarbonate, cumene hydroperoxide, azobis(isobutyronitrile), and the like. Generally, from about 0.01 to 5 percent by weight of thermal initiator is used.

Preferably, UV-initiated polymerization is carried out, using photoinitiators. Such initiators are well known and have been described, for example, in polymerization art, e.g., Chapter II of "Photochemistry" by Calvert and Pitts, John Wiley & Sons (1966). The preferred initiators are photoinitiators which facilitate polymerization when the composition is irradiated. Representative examples of such initiators include acyloin and derivatives thereof, such as benzoin, benzoin methyl ether, benzoin ethyl ether, benzoin isopropyl ether, benzoin isobutyl ether and a-methylbenzoin; diketones such as benzil and diacetyl, etc.; ketones such as acetophenone, a,a,a-tribromoacetophenone, a,a-diethoxyacetophenone (DEAP), 2-hydroxy-2-methyl-1phenyl-1-propanone, o-nitro-a,a,a-tribromoacetophenone, benzophenone and p,p'-tetramethyldiaminobenzophenone; a-acyloxime esters such as benzil-(O-ethoxycarbonyl)-a-monoxime; ketone/amine combinations such as benzophenone/N-methyldiethanolamine, benzophenone/tributylamine and benzophenone/Michler's ketone; and benzil ketals such as benzil dimethyl ketal, benzil diethyl ketal and 2,5-dichlorobenzil dimethyl ketal. Normally, the photoinitiator is used in amounts ranging from about 0.01 to 5% by weight of the total oligomeric composition.

Preferably, about 0.1to 1.0% of photoinitiator is used in the polymerizable compositions.

Polymerization may be carried out in bulk in a conventional manner or in the presence of a solvent. Useful solvents to carry out the polymerization include ketones, like acetone, methyl ethyl ketone, methyl propyl ketone, methyl isobutyl ketone and cyclohexane; alcohols like ethanol, isopropanol or ethyl-cellosolve; ethers like ethylene glycol or diethylene glycol dimethyl ether, esters like ethyl acetate or isopropyl acetate; dimethyl sulfoxide; N-methylpyrrolidone; N,N-dimethylformamide; N,N-dimethylacetamide and the like.

The crosslinking polymerization is carried out in molds, which can consist of plastics, glass or metal and can be any shape. For making films and sheets, the molds are preferably made of glass plates and lined with MYLAR or other polymer films and held together by clamps, using a spacer of desired thickness. Contact lenses are preferably prepared in UV-permeable plastic molds.

After polymerization is complete, the polymer is removed from the mold and any solvent present is either removed by vacuum drying or extraction with water and water-soluble solvents, or water-solvent mixtures. Useful solvents are acetone, ethanol, methanol, isopropanol and the like. Azeotropic distillation is also a useful procedure to remove certain solvents. After the solvent is removed, the polymer is equilibrated in distilled water and its water content is determined gravimetrically. Placing the crosslinked polymer sample in hot water is useful in helping to stabilize and to strengthen the sample. All subsequent measurements are carried out on the water-equilibrated polymers.

The resultant contact lenses are optically clear, strong, flexible, highly oxygen permeable and wettable. Further, the instant lenses are characterized by their ease of manufacture.

A description of the testing methods used on the polymer films is as follows: a) Polymerization contraction is determined from the difference of the areas of the polymer solution between the plates before polymerization ($A_1$) and the area of the polymer sheet after polymerization ($A_2$) as follows:

$$\frac{A_1 - A_2}{A_1} \times 100.$$

b) Tensile strength is qualitatively evaluated by pulling on a sheet of the material by hand and then comparing the result to a material previously evaluated by a micromechanical tester to be 14 kg/cm$^2$. A measurement found to be similar to this "standard" is designated (2); a higher value is designated (1); a lower value is designated (3); while a much lower value is designated (4).

The following examples (1-3) illustrates the synthesis of copolymer backbones containing pendant hydroxyl groups from hydrophilic comonomers, reaction of these copolymers with isocyanatoethyl methacrylate (to form pendant vinylic groups) and subsequent polymerization into hydrogels.

EXAMPLE 1

Copolymer backbones are synthesized from N-vinyl pyrrolidone (NVP) and 2-hydroxyethyl methacrylate (HEMA) by combining the monomers with methanol and 0.1% initiator (Vazo 64) as indicated in the following Table. The solutions are polymerized at 55° C. for 16 hours. The polymerized backbone is precipitated in ethyl ether, the precipitate is then crushed into a powder (or cur into small pieces if it is too soft to crush) and extracted in ethyl ether. The precipitate is finally dried under vacuum at 50° C. and stored in a desiccator.

The mole percent of each monomeric component in the copolymer is analyzed by NMR and molecular weight is determined by GPC.

EXAMPLE 2

Copolymer backbones are synthesized from 2-hydroxyethyl methacrylate (HEMA) and N,N-dimethyl acrylamide (DMA) as in Example 1, except for sample 2 which is polymerized in U.V. light (3.5 hr.) using benzoin methyl ether (BME) as initiator. Weight percent reactants and analytical results are presented in the following Table on page 22.

Synthesis of NVP/HEMA Copolymers

| | Reaction Solution | | | | | Final Copolymer Composition | |
|---|---|---|---|---|---|---|---|
| Sample # | Wt. % NVP | Wt. % HEMA | Wt. % Methanol | Mole Ratio NVP/HEMA | Reaction Temperature/Time | (NMR Analysis) Mole Ratio NVP/HEMA | MW, GPC |
| 1 | 12.3 | 11.3 | 76.5 | 56/44 | 50° C./16 hr | 40/60 | ND |
| 2 | 21.8 | 2.4 | 75.8 | 90/10 | " | 80/20 | 270,000 |
| 3 | 12.8 | 12.9 | 74.3 | 54/46 | " | 15/85 | 360,000 |
| 4 | 22.5 | 3.3 | 74.2 | 89/11 | " | 80/20 | 130,000 |

ND = Not done

Synthesis of DMA/HEMA Copolymers

| | Reaction Solution | | | | | Final Copolymer Composition | |
|---|---|---|---|---|---|---|---|
| Sample # | Wt. % HEMA | Wt. % DMA | Wt. % Methanol | Mole Ratio HEMA/DMA | Reaction Temperature/Time | (NMR Analysis) Mole Ratio HEMA/DMA | MW, GPC |
| 1 | 14.4 | 9.7 | 75.9 | 53/47 | 55° C./48 hr | 70/30 | 460,000 |
| 2 | 12.1 | 12.1 | 75.8 | 43/57 | hv, RT/3.5 hr | 69/31 | 340,000 |

EXAMPLE 3

As shown below, polymer properties are varied and no contraction is seen during polymerization.

Polymerization Contraction of IEM Modified Hydrophilic Copolymers in DMSO

| Sample # | Copolymer Composition | Copolymer Molecular Wt. | Wt. % Copolymer in DMSO | Mole % IEM | Polymerization Contraction % Area | Physical Characteristics After Boiling Clarity | Strength | % H₂O Content |
|---|---|---|---|---|---|---|---|---|
| 1 | 20 HEMA/80 NVP | 270,000 | 10 | 10 | 0 | hazy | 4 | ND |
| 2 | 20/HEMA/80 NVP | 270,000 | 10 | 10 | 0 | sl. hazy | 4 | 80 |
| 3 | 20 HEMA/80 NVP | 130,000 | 10 | 10 | 0 | sl. hazy | 4 | 86 |
| 4 | 60 HEMA/40 NVP | ND | 9.2 | 10 | 0 | clear | 4 | 44 |
| 5 | 60 HEMA/40 NVP | ND | 10 | 20 | 0 | blue haze | 3-4 | 39 |
| 6 | 69 HEMA/31 DMA | 340,000 | 10 | 5 | 0 | sl. hazy | 4 | 64 |
| 7 | 70 HEMA/30 DMA | 460,000 | 10 | 5 | 0 | sl. hazy | 4 | 65 |
| 8 | 85 HEMA/15 NVP | 360,000 | 10 | 12 | 0 | sl. hazy | 4 | 54 |

ND = Not done

Hydrogels are prepared from copolymers synthesized in Examples 1 and 2. In general, solutions of the NVP/HEMA or HEMA/DMA backbones are prepared by dissolving 0.5 g of copolymer in 4.5 g dimethyl sulfoxide (DMSO, Aldrich Gold Label) at 60° C. under nitrogen with overhead stirring. The solution is cooled to room temperature, IEM added (to attain the appropriate mole percent indicated in the Table) along with 0.5 μL dibutyltin dilaurate catalyst, under N₂ and reacted at room temperature overnight.

Following IEM modification, approximately 0.1 to 0.2% initiator, benzoin methyl ether (BME) is mixed into the reaction solution, the solution is poured into mylar lined glass molds (0.031" silicone cord spacer) and U.V. irradiated for 3 hrs, RT. The polymerized sheets are extracted in water (several days) and placed in boiling water for 10 minutes before physical properties are determined.

The following examples (4-5) illustrates the synthesis of copolymer backbones containing pendant hydroxyl groups from hydrophilic and hydrophobic comonomers, reaction of these copolymers with IEM (to form pendant vinylic groups) and subsequent polymerization into hydrogels.

EXAMPLE 4

In this example, copolymer backbones containing a combination of hydrophilic and hydrophobic comonomers are prepared. These copolymers are synthesized by combining HEMA with ethyl hexyl acrylate (EHA), cyclohexyl methacrylate (CHMA) or hydroxypropyl methacrylate (HPMA) or by combining NVP with HPMA in methanol as in Example 1. Monomer ratios, synthesis conditions and the results are listed in the following Table.

Synthesis of Hydrophilic/Hydrophobic Backbone Copolymers

| Sample # | Reaction Solution Wt. % Comonomers | | Wt. % Methanol | Mole Ratio Comonomers | Reaction Temperature/Time | Final Copolymer Composition by NMR Analysis Mole Ratio Comonomers | MW |
|---|---|---|---|---|---|---|---|
| 1 | 12.3 NVP | 11.3 HPMA | 76.4 | 59/41 | 55° C./16 hr | 40 NVP/60 HPMA | 250,000 |
| 2 | 21.8 NVP | 2.4 HPMA | 75.7 | 92/8 | " | 80 NVP/20 HPMA | 140,000 |
| 3 | 15.4 HEMA | 7.7 HPMA | 76.8 | 69/31 | 60° C./48 hr | 70 HEMA/30 HPMA | 180,000 |
| 4 | 12.8 HEMA | 12.9 HPMA | 74.3 | 52/48 | 60° C./16 hr | 52 HEMA/48 HPMA | ND |
| 5 | 18.0 HEMA | 6.1 CHMA | 75.9 | 56/44 | 55-65° C./6 days | 80 HEMA/20 CHMA | 110,000 |
| 6 | 12.1 HEMA | 12.1 CHMA | 75.7 | 79/21 | " | 53 HEMA/47 CHMA | 10,000 |

-continued

Synthesis of Hydrophilic/Hydrophobic Backbone Copolymers

| Sample # | Wt. % Comonomers | | Reaction Solution Wt. % Methanol | Mole Ratio Comonomers | Reaction Temperature/Time | Final Copolymer Composition by NMR Analysis Mole Ratio Comonomers | MW |
| --- | --- | --- | --- | --- | --- | --- | --- |
| 7 | 18.1 HEMA | 6.0 EHA | 75.9 | 82/18 | 55-65° C./6 days | 88 HEMA/12 EHA | 200,000 |
| 8 | 12.1 HEMA | 12.2 EHA | 75.7 | 60/40 | " | 65 HEMA/35 EHA | 190,000 |

ND = Not done

EXAMPLE 5

Hydrogels are prepared as in Example 3 from the hydrophilic/hydrophobic copolymers prepared in Example 4.

EXAMPLE 6

Copolymer backbones are prepared and analyzed as in Example 1 from NVP, HEMA and MMA with monomer ratios as given in the following Table.

Synthesis of NVP/HEMA/MMA Copolymer

| Sample # | Reaction Solution Wt. % NVP | Wt. % HEMA | Wt. % MMA | Wt. % Methanol | Mole Ratio NVP/HEMA/MMA | Reaction Temperature/Time | Final Copolymer Composition by NMR Analysis Mole Ratio NVP/HEMA/MMA | MW, GPC |
| --- | --- | --- | --- | --- | --- | --- | --- | --- |
| 1 | 22 | 3.3 | 2.7 | 72 | 79/10/11 | 55° C./16 hr | 55/23/22 | 210,000 |

As shown below, little or no contraction occurred during polymerization and polymer properties vary widely.

EXAMPLE 7

Hydrogels are prepared from the tricomponent co-

Polymerization Contraction of IEM Modified Hydrophilic/Hydrophobic Backbone Copolymers in DMSO

| Notebook # | Copolymer Composition | Copolymer Molecular Wt. | Wt. % Copolymer in DMSO | Mole % IEM | Polymerization Contraction % Area | Physical Characteristics After Boiling Clarity | Strength | % H$_2$O Content |
| --- | --- | --- | --- | --- | --- | --- | --- | --- |
| 1 | 70 HEMA/30 HPMA | 180,000 | 10 | 5 | 0.85 | hazy | 1 | 35 |
| 2 | " | " | 10 | 10 | 0 | clear | 1 | 27 |
| 3 | 52 HEMA/48 HPMA | ND | 2 | 10 | 0 | cloudy | 4 | 60 |
| 4 | 88 HEMA/12 EHA | 200,000 | 10 | 5 | 0 | hazy | 1 | 27 |
| 5 | " | " | 10 | 10 | 0 | clear | 1 | 31 |
| 6 | 65 HEMA/35 EHA | 190,000 | 10 | 5 | 0 | clear with cloudy spots | 1 | 38 |
| 7 | " | " | 10 | 10 | 0 | cloudy with clear spots | 1 | 23 |
| 8 | 80 HEMA/20 CHMA | 110,000 | 6 | 10 | 0 | opaque | 4 | 84 |
| 9 | 53 HEMA/47 CHMA | 10,000 | 10 | 10 | 0 | cloudy | 4 | 82 |
| 10 | 80 NVP/20 HPMA | 140,000 | 10 | 10 | 0 | cloudy* | ND | ND |
| 11 | 40 NVP/60 HPMA | 250,000 | 10 | 10 | 0 | cloudy | 3 | 66 |

*Not boiled
ND = Not done

The following examples (6-7) illustrates the synthesis of a tricomponent copolymer backbone from hydrophilic, hydrophobic and hydroxyl containing comonomers, subsequent IEM modification of this copolymer (to form pendant vinylic groups) and subsequent polymerization in to a hydrogel.

polymer backbone prepared in Example 6 according to the procedure in Example 3.

As shown below, no polymerization contraction occurred.

IEM Modified Poly(NVP/HEMA/MMA) Copolymer Polymerized in DMSO

| Sample # | % Copolymer Composition | Mole % IEM | Wt. % Copolymer in DMSO | Polymerization Contraction % Area | Clarity and Strength Before Boiling | MW, GPC |
| --- | --- | --- | --- | --- | --- | --- |
| 1 | 55/23/22 (NVP/HEMA/MMA) | 10 | 10 | 0 | soft, sticky gel, could not remove from mold became opaque while in H$_2$O | 210,000 |

The following examples (8-11) illustrate the synthesis of hydrogels by IEM modification and subsequent polymerization of commercially available polymers containing pendant hydroxyl groups.

EXAMPLE 8

Hydrogels are prepared from styrene/allyl alcohol copolymers as in Example 3.

As shown below, polymerization contraction is observed for the 1150 molecular weight copolymer but not for the 3000 molecular weight copolymer.

Polymerization Contraction of IEM Modified Styrene/Allyl Alcohol Copolymers

| Sample # | Copolymer Composition | Copolymer Molecular Wt. | Wt. % Copolymer in DMSO | Mole % IEM | Wt. % BME | Polymerization Contraction % Area | Physical Characteristics After Boiling | | % H$_2$O Content |
|---|---|---|---|---|---|---|---|---|---|
| | | | | | | | Clarity | Strength | |
| 1 | 7.3–8.0 Wt. % OH content | 1150 | 10 | 42.4 | 0.1 | 6.8 | hazy | 4 | 30.7 |
| 2 | 7.3–8.0 Wt. % OH content | " | 20 | 19.7 | 0.1 | 2.8 | opaque | 4 | 23.5 |
| 3 | 5.4–6.0 Wt. % OH content | 3000 | 10 | 33 | 0.1 | 0 | cloudy | 4 | 33.0 |
| 4 | 5.4–6.0 Wt. % OH content | " | 10 | 33 | 0.1 | 0 | hazy | 3–4 | 73.4 |

EXAMPLE 9

Hydrogels are prepared from poly(hydroxypropyl methacrylate) according to Example 3.

As shown below, little polymerization contraction is observed for 20 mole IEM containing hydrogels.

IEM Modified Poly(hydroxypropyl methacrylate) [pHPMA] Polymerized in DMSO

| Sample # | Mole % IEM | Polymerization Contraction % Area | Physical Characteristics After Boiling | | % H$_2$O Content |
|---|---|---|---|---|---|
| | | | Clarity | Strength | |
| 1 | 5 | ND | clear | 1 | 28.7 |
| 2 | 10 | ND | clear | 1 | 38.8 |
| 3 | 20 | <0.7 | hazy with clear spots | 1 | 18.7 |

EXAMPLE 10

Hydrogels are prepared from 2-hydroxyethyl methacrylate (Scientific Polymer Products MW 300,000) according to Example 3.

As shown below, less than 3 percent polymerization contraction is observed for IEM modification up to 20 mole percent.

Polymerization Contraction of IEM Modified pHEMA

| Sample # | Mole % IEM | Polymerization Contraction % Area | Physical Characteristics After Boiling | | % H$_2$O Content |
|---|---|---|---|---|---|
| | | | Clarity | Strength | |
| 1 | 10 | 0 | clear | 2 | 43 |
| 2 | 20 | 2.7 | sl. hazy | 1 | 29 |

EXAMPLE 11

Hydrogels are prepared from polyvinyl alcohol (PVA) of molecular weight 3000, 14,000, 78,000 and 100,000 according to Example 3, except that 0.05 to 0.1% BME is the initiator.

As shown below, polymerization contraction is observed to increase with increasing IEM modification for a given molecular weight PVA. Polymerization contraction is manifested at lower IEM modification with increasing molecular weight PVA.

Polymerization Contraction of IEM Modified PVA in DMSO

| Sample # | Molecular Wt. PVA | Mole % IEM | Wt. % BME | Polymerization Contraction % Area | Physical Characteristics After Boiling | | % H$_2$O Content |
|---|---|---|---|---|---|---|---|
| | | | | | Clarity | Strength | |
| 1 | 3,000 | 3 | 0.1 | 0 | clear | 4 | 76.8 |
| 2 | 3,000 | 20 | 0.1 | 13.6 | clear | 2 | 29.9 |
| 3 | 14,000 | 3 | 0.1 | 0 | clear | 4 | 88.4 |
| 4 | 14,000 | 20 | 0.1 | 17.4 | clear | 3 | 55.5 |
| 5 | 78,000 | 3 | 0.1 | 0 | clear | 4 | 83.0 |
| 6 | 78,000 | 6.5 | 0.05 | 0 | clear | 4 | 74.1 |
| 7 | 78,000 | 10 | 0.1 | 8.7 | clear | 4 | 67.6 |
| 8 | 78,000 | 15 | 0.1 | 7.9 | clear | 2 | 60.6 |
| 9 | 78,000 | 20 | 0.1 | 14.4 | clear | 3 | 56.5 |

-continued

Polymerization Contraction of IEM Modified PVA in DMSO

| Sample # | Molecular Wt. PVA | Mole % IEM | Wt. % BME | Polymerization Contraction % Area | Physical Characteristics After Boiling | | % $H_2O$ Content |
|---|---|---|---|---|---|---|---|
| | | | | | Clarity | Strength | |
| 10 | 100,000 | 0.3 | 0.1 | 6.7 | hazy spots | 4 | ND |

ND = Not done

EXAMPLE 12

The following example illustrates the increase in strength and reduction in water content of a 3 mol percent IEM modified PVA hydrogel without the addition of a hydrophobic comonomer during polymerization.

A 15 g sample of Air Products Vinol 325 (77–79,000 MW. 98–99% hydrolyzed PVA) is extracted with 200 ml of methanol in a soxhlet extractor for three days to remove sodium acetate. The PVA is subsequently dried overnight under vacuum at 90° C.

6 g of this extracted, dried PVA is dissolved in 54 g of Aldrich Gold Label (99.9% pure) dimethyl sulfoxide under nitrogen (flowing through a desiccant filled drying column) at 60° C. over a 30 minute period in a three-necked flask with stirring. The solution is allowed to cool at room temperature for 1 hour. Then 3.0 mol percent (0.578 ml), relevant to the PVA, of 2-isocyanatoethyl methacrylate (IEM, Dow Chemical) is added dropwise over 1.5 minutes. Immediately following the IEM addition, 7 mol percent (0.5175 ml), relevant to the PVA, of phenyl isocyanate is added with rapid stirring under nitrogen. The reaction mixture is stirred overnight to room temperature to complete the reaction.

A control sample is made in like manner without the addition of phenyl isocyanate.

Following the general procedure of Example 3, the PVA modified with IEM and phenyl isocyanate as well as the PVA control modified only with IEM are photopolymerized using 1-hydroxycyclohexyl phenyl ketone photoinitiator in a flat sandwich mold using g UV light (360 nm) at room temperature for 3 hours. The polymerized films are removed from the molds and extracted with water and boiled for 10 minutes in water before the physical properties given on the table below are determined.

| Sample | Mole % Reacted Group IEM | P-NCO | Wt % PVA in DMSO | Physical Properties | | % Water Content |
|---|---|---|---|---|---|---|
| | | | | Clarity | Strength | |
| A | 3 | 7 | 10 | clear | 3 | 54.8 |
| B | 3 | 0 | 10 | clear | 4 | 83.0 |
| C | 3 | 7 | 5.1 | clear | 2 | 55.6 |
| D | 3 | 0 | 5.1 | clear | 4 | 90.3 |

IEM is 2-isocyanatoethyl methacrylate.
P-NCO is cyclohexyl isocyanate.

There is no polymerization contraction in any of the samples.

The addition of phenyl isocyanate to the PVA clearly increased the strength of the polymerized product while still maintaining an acceptable % water content.

EXAMPLE 13

The following example also illustrates the increase in strength and reduction in water content of a 3 mol percent IEM modified PVA hydrogel without the addition of a hydrophobic comonomer during polymerization.

The procedure of Example 12 is repeated where 7 mol percent (0.606 ml) of cyclohexyl isocyanate is substituted for the phenyl isocyanate.

| Sample | Mole % Reacted Group IEM | C-NCO | Wt % PVA in DMSO | Physical Properties | | % Water Content |
|---|---|---|---|---|---|---|
| | | | | Clarity | Strength | |
| A | 3 | 7 | 10 | hazy | 4 | 60.8 |
| B | 3 | 0 | 10 | clear | 4 | 83.0 |

IEM is 2-isocyanatoethyl methacrylate.
C-NCO is cyclohexyl isocyanate.

There is no polymerization contraction in any of the samples.

The addition of cyclohexyl isocyanate to the PVA clearly increased the strength of the polymerized product while still maintaining an acceptable % water content.

The following example 14–16 illustrate the synthesis of copolymer backbones containing pendant hydroxyl groups from hydrophilic comonomers, reaction of these copolymers with isocyanatoethyl methacrylate (to form pendant vinylic groups) and subsequent polymerization with added hydrophobic comonomer into hydrogels.

EXAMPLE 14

Copolymer backbones are synthesized from N-vinyl pyrrolidone (NVP) and 2-hydroxyethyl methacrylate (HEMA) by combining the monomers with methanol and 0.1% initiator (Vazo 64) as indicated in the following Table. The solutions are polymerized at 55° C. for 16 hours. The polymerized backbone is precipitated in ethyl ester, the precipitate is then crushed into a powder (or cut into small pieces if it is too soft to crush) and extracted in ethyl ether. The precipitate is finally dried under vacuum at 50° C. and stored is a desiccator.

The mole percent of each monomeric component in the copolymer is analyzed by NMR and molecular weight is determined by GPC.

EXAMPLE 15

Copolymer backbones are synthesized from 2-hydroxyethyl methacrylate (HEMA) and N,N-dimethyl acrylamide (DMA) as in Example 14, except for sample 2 which is polymerized in U.V. light (3.5 hr.) using benzoin methyl ether (BME) as initiator. See table on page 43.

| Synthesis of NVP/HEMA Copolymers | | | | | | | |
|---|---|---|---|---|---|---|---|
| | Reaction Solution | | | | | Final Copolymer Composition | |
| Sample # | Wt. % NVP | Wt. % HEMA | Wt. % Methanol | Mole Ratio NVP/HEMA | Reaction Temperature/Time | (NMR Analysis) Mole Ratio NVP/HEMA | MW, GPC |
| 1 | 12.3 | 11.3 | 76.5 | 56/44 | 50° C./16 hr | 40/60 | ND |
| 2 | 21.8 | 2.4 | 75.8 | 90/10 | " | 80/20 | 270,000 |
| 3 | 12.8 | 12.9 | 74.3 | 54/46 | " | 15/85 | 360,000 |
| 4 | 22.5 | 3.3 | 74.2 | 89/11 | " | 80/20 | 130,000 |

ND = Not done

| Synthesis of DMA/HEMA Copolymers | | | | | | | |
|---|---|---|---|---|---|---|---|
| | Reaction Solution | | | | | Final Copolymer Composition | |
| Sample # | Wt. % HEMA | Wt. % DMA | Wt. % Methanol | Mole Ratio HEMA/DMA | Reaction Temperature/Time | NMR Analysis Mole Ratio HEMA/DMA | MW, GPC |
| 1 | 14.4 | 9.7 | 75.9 | 53/47 | 55° C./48 hr | 70/30 | 460,000 |
| 2 | 12.1 | 12.1 | 75.8 | 43/57 | hu, RT/3.5 hr | 69/31 | 340,000 |

EXAMPLE 16

Hydrogels are prepared from the copolymers synthesized in Examples 14 and 15.

In general, solutions of the NVP/HEMA or DMA/HEMA backbones are prepared by dissolving 0.5 g of copolymer in 4.5 g dimethyl sulfoxide (DMSO, Aldrich Gold Label) at 60° C. under nitrogen with overhead stirring. The solution is cooled to room temperature, IEM added (to attain the appropriate mole percent indicated in the Table) along with 0.5 μL dibutyltin dilaurate catalyst, under N₂ and reacted at room temperature overnight.

Following IEM modification, methyl methacrylate (MMA) comonomer is added along with approximately 0.1 to 0.2% initiator (BME) and the solution is mixed well. The solution is then poured into mylar lined glass molds (0.031" silicone cord spacer) and U.V. irradiated for 3 hrs, RT. The polymerized sheets are extracted in water (several days) and placed in boiling water for 10 minutes before physical properties are determined.

As shown below, polymer physical properties are varied and no contraction is seen during polymerization.

| Polymerization Contraction of IEM Modified Hydrophilic Copolymers in DMSO With Added Comonomer | | | | | | | | | |
|---|---|---|---|---|---|---|---|---|---|
| Sample # | Copolymer Composition | Copolymer Molecular Wt. | Wt. % Copolymer in DMSO | Mole % IEM | Wt. % MMA | Polymerization Contraction % Area | Physical Characteristics After Boiling | | |
| | | | | | | | Clarity | Strength | |
| 1 | 20 HEMA/80 NVP | 270,000 | 10 | 10 | 18 | 0 | hazy | 4 | 72 |
| 2 | 20 HEMA/80 NVP | 270,000 | 10 | 10 | 25 | 0 | hazy | 1 | 58 |
| 3 | 20 HEMA/80 NVP | 130,000 | 10 | 10 | 24 | 0 | sl. hazy | 3 | 71 |
| 4 | 60 HEMA/40 NVP | ND | 9.2 | 10 | 24 | ND | clear | 3 | 38 |
| 5 | 60 HEMA/40 NVP | ND | 10 | 20 | 25 | 0 | blue haze | 1 | 31 |
| 6 | 85 HEMA/15 NVP | 360,000 | 11 | 12 | 27 | 0 | sl. hazy | 2 | 42 |
| 7 | 69 HEMA/31 DMA | 340,000 | 10 | 5 | 24 | 0 | sl. hazy | 1 | 42 |
| 8 | 70 HEMA/30 DMA | 460,000 | 10 | 5 | 27 | 0 | clear | 1 | 49 |

ND = Not done

The following examples 17-18 illustrate the synthesis of copolymer backbones containing pendant hydroxyl groups from mixtures of hydrophyllic and hydrophobic comonomers, subsequent reaction with IEM and polymerization into hydrogels with added MMA.

EXAMPLE 17

In this example copolymer backbones containing a combination of hydrophilic and hydrophobic comonomers are prepared. These copolymers are synthesized by combining HEMA with ethyl hexyl acrylate (EHA), cyclohexyl methacrylate (CHMA) or hydroxypropyl methacrylate (HPMA) or by combining NVP with HPMA in methanol as in Example 14. Monomer ratios, synthesis conditions and the results are listed in the following Table.

| Synthesis of Hydrophilic/Hydrophobic Copolymers | | | | | | | |
|---|---|---|---|---|---|---|---|
| | Reaction Solution | | | | | Final Copolymer Composition by | |
| Sample # | Wt. % Comonomers | | Wt. % Methanol | Mole Ratio Comonomers | Reaction Temperature/Time | NMR Analysis Mole Ratio Comonomers | MW, GPC |
| 1 | 12.3 NVP | 11.3 HPMA | 76.4 | 59/41 | 55° C./16 hr | 40 NVP/60 HPMA | 250,000 |
| 2 | 21.8 NVP | 2.4 HPMA | 75.7 | 92/8 | " | 80 NVP/20 HPMA | 140,000 |
| 3 | 15.4 HEMA | 7.7 HPMA | 76.8 | 69/31 | 60° C./48 hr | 70 HEMA/30 HPMA | 180,000 |

-continued

Synthesis of Hydrophilic/Hydrophobic Copolymers

| Sample # | Wt. % Comonomers | | Wt. % Methanol | Mole Ratio Comonomers | Reaction Temperature/Time | Final Copolymer Composition by NMR Analysis Mole Ratio Comonomers | MW, GPC |
|---|---|---|---|---|---|---|---|
| 4 | 12.8 HEMA | 12.9 HPMA | 74.3 | 52/48 | 60° C./16 hr | 52 HEMA/48 HPMA | ND |
| 5 | 18.0 HEMA | 6.1 CHMA | 75.9 | 56/44 | 55–65° C./6 days | 80 HEMA/20 CHMA | 110,000 |
| 6 | 12.1 HEMA | 12.1 CHMA | 75.7 | 79/21 | " | 53 HEMA/47 CHMA | 10,000 |
| 7 | 18.1 HEMA | 6.0 EHA | 75.9 | 82/18 | 55–65° C./6 days | 88 HEMA/12 EHA | 200,000 |
| 8 | 12.1 HEMA | 12.2 EHA | 75.7 | 60/40 | " | 65 HEMA/35 EHA | 190,000 |

ND = Not done

EXAMPLE 18

Hydrogels are prepared as in Example 16 from the hydrophilic/hydrophobic copolymers prepared in Example 17.

EXAMPLE 19

Copolymer backbones are prepared and analyzed as in Example 14 from NVP, HEMA and MMA with monomer ratios as given in the following Table.

Synthesis of NVP/HEMA/MMA Copolymer

| Sample # | Wt. % NVP | Wt. % HEMA | Wt. % MMA | Wt. % Methanol | Mole Ratio NVP/HEMA/MMA | Reaction Temperature/Time | Final Copolymer Composition by NMR Analysis Mole Ratio NVP/HEMA/MMA | MW, GPC |
|---|---|---|---|---|---|---|---|---|
| 1 | 22 | 3.3 | 2.7 | 72 | 79/10/11 | 55° C./16 hr | 55/23/22 | 210,000 |

As shown below, little or no contraction occurs during polymerization and a variety of physical properties of the boiled hydrogen is observed.

EXAMPLE 20

Hydrogels are prepared from the tricomponent co-

Polymerization Contraction of IEM Modified Copolymers in DMSO With Added Comonomer

| Sample # | Copolymer Composition | Copolymer Molecular Wt. | Wt. % Copolymer in DMSO | Mole % IEM | Wt. % MMA | Polymerization Contraction % Area | Physical Characteristics After Boiling | | H₂O % Content After Boiling |
|---|---|---|---|---|---|---|---|---|---|
| | | | | | | | Clarity | Strength | |
| 1 | 70 HEMA/30 HPMA | 180,000 | 10 | 5 | 21 | 0 | hazy | 1 | 33 |
| 2 | " | 180,000 | 10 | 10 | 20 | 0 | hazy | 1 | 27 |
| 3 | 52 HEMA/48 HPMA | ND | 2 | 10 | 21 | 0 | cloudy | 4 | 67 |
| 4 | 88 HEMA/12 EHA | 200,000 | 10 | 5 | 21 | 0 | hazy | 1 | 33 |
| 5 | 88 HEMA/12 EHA | 200,000 | 10 | 10 | 22 | 0 | hazy | 1 | 21 |
| 6 | 65 HEMA/35 EHA | 190,000 | 10 | 5 | 28 | 0 | cloudy with clear spots | 1 | 20 |
| 7 | 80 HEMA/20 CHMA | 110,000 | 6 | 10 | 19 | 0 | opaque | 2 | 80 |
| 8 | 53 HEMA/47 CHMA | 10,000 | 10 | 10 | 23 | 0 | opaque | 4 | 67 |
| 9 | 80 NVP/20 HPMA | 140,000 | 10 | 10 | 24 | 0 | ND | ND | ND |
| 10 | 40 NVP/60 HPMA | 250,000 | 10 | 10 | 24 | 0 | cloudy | 1 | 66 |

ND = Not done

The following examples (19-20) illustrate the synthesis of a tricomponent copolymer backbone from hydrophilic, hydrophobic and hydroxyl containing comonomers, subsequent IEM modification and polymerization into a hydrogel in the presence of additional MMA.

polymer backbone prepared in Example 19 according to the procedure in Example 16.

As shown below, no polymerization contraction occurred.

IEM Modified Poly(NVP/HEMA/MMA) Copolymers Polymerized in DMSO With and Added Comonomer

| Sample # | % Copolymer Composition | Mole % IEM | Wt. % Copolymer in DMSO | Wt. % MMA (Comonomer) | Polymerization Contraction % Area | Clarity and Strength Before Boiling | MW, GPC |
|---|---|---|---|---|---|---|---|
| 1 | 55/23/22 (NVP/HEMA/MMA) | 10 | 10 | 24.2 MMA | 0 | soft, sticky gels, could not remove from mold became opaque while in H₂O | 210,000 |

The following examples (21-24) illustrate the synthesis of hydrogels by IEM modification and subsequent polymerization (with added comonomer) of commercially available polymers containing pendant hydroxyl groups.

EXAMPLE 21

Hydrogels are prepared from styrene/allyl alcohol copolymers according to Example 16, except that MMA or DMA is used as the comonomer and 0.06 to 0.5% BME as initiator.

As shown below, polymerization contraction is observed and decreases with increasing IEM content.

EXAMPLE 23

Hydrogels are prepared form 2-hydroxyethyl methacrylate (Scientific Polymer Products MW 300,000) according to Example 16.

As shown below, less than 3 percent polymerization contraction is observed for IEM modification up to 20 mole percent.

Polymerization Contraction of IEM Modified Styrene/Allyl Alcohol Copolymers With Added Comonomer

| Sample # | Copolymer Composition | Copolymer Molecular Wt. | Wt. % Copolymer in DMSO | Mole % IEM | Wt. % Comonomer | Wt. % BME | Polymerization Contraction (% Area) | Physical Characteristics After Boiling Clarity | Strength | % H$_2$O Content |
|---|---|---|---|---|---|---|---|---|---|---|
| 1 | 7.3–8.0 wt % OH content | 1150 | 10 | 8.3 | 28.6 MMA | 0.09 | Did not polymerize | ND | ND | ND |
| 2 | 7.3–8.0 wt % OH content | " | 10 | 19.7 | 36.3 DMA | 0.06 | 5.4 | could not remove from mold | | ND |
| 3 | 7.3–8.0 wt % OH content | " | 20 | 19.7 | 25.8 DMA | 0.1 | 2.8 | could not remove from mold | | ND |
| 4 | 7.3–8.0 wt % OH content | " | 10 | 42.4 | 33.3 DMA | 0.1 | 0 | hazy | ND | 30.5 |
| 5 | 7.3–8.0 wt % OH content | " | 10 | 42.4 | 35 DMA | 0.5 | 0 | sl. hazy | ND | 31.4 |
| 6 | 5.4–6.0 wt % OH content | 3000 | 10 | 33 | 25.3 MMA | 0.1 | 0 | hazy | 2 | 70.3 |
| 7 | 5.4–6.0 wt % OH content | " | 10 | 33 | 26.7 MMA | 0.1 | 0 | hazy | 4 | 25.9 |
| 8 | 5.4–6.0 wt % OH content | " | 10 | 33 | 29.3 DMA | 0.1 | 0 | hazy | 3 | 74.8 |
| 9 | 5.4–6.0 wt % OH content | " | 10 | 33 | 34.0 DMA | 0.1 | 0 | hazy | 3 | 74.2 |

ND = Not done

Polymerization Contraction of IEM Modified pHEMA With Added Comonomer

| Sample # | Mole % IEM | Wt. % MMA | Polymerization Contraction % Area | Physical Characteristics After Boiling Clarity | Strength | % H$_2$O Content |
|---|---|---|---|---|---|---|
| 1 | 10 | 21 | 0 | clear | 2 | 31 |
| 2 | 20 | 27 | 2.1 | cloudy | 1 | 29 |

EXAMPLE 22

Hydrogels are prepared from poly(hydroxypropyl methacrylate) according to Example 16, except that HEMA or DMA are used as the comonomers for comonomer containing samples and 0.1% BME is the initiator.

As shown below, the hydrogels are generally clear and little or no polymerization contraction is observed for the 20 mole IEM containing samples.

EXAMPLE 24

Hydrogels are prepared from polyvinyl alcohol (PVA) of molecular weight 3000, 14,000, 78,000 and 100,000 according to Example 16, except that 0.05% to 0.1% initiator (BME) is used.

As shown below, polymerization contraction is observed to increase with increasing IEM modification for a given molecular weight PVA. Polymerization contraction is manifested at lower IEM modification with increasing molecular weight PVA.

IEM Modified Poly(hydroxypropyl methacrylate) [pHPMA] Polymerized in DMSO With Added Comonomer

| Sample # | Mole % IEM | Wt. % Comonomer | Polymerization Contraction % Area | Physical Characteristics After Boiling Clarity | Strength | % H$_2$O Content |
|---|---|---|---|---|---|---|
| 1 | 5 | 28.9 HEMA | ND | clear | 2 | 38.6 |
| 2 | 5 | 60.6 HEMA | ND | clear | 1 | 35.4 |
| 3 | 5 | 34.5 DMA | ND | cloudy | 4 | 67.8 |
| 4 | 10 | 25.2 HEMA | ND | clear | 1 | 38.1 |
| 5 | 20 | 10.5 HEMA | 0 | ND | ND | ND |

ND = Not done

Polymerization Contraction of IEM modified PVA in DMSO With Added Comonomer

| Sample # | Molecular Wt. PVA | Mole % IEM | Wt. % MMA | Wt. % BME | Polymerization Contraction % Area | Physical Characteristics After Boiling | | % H$_2$O Content |
| --- | --- | --- | --- | --- | --- | --- | --- | --- |
| | | | | | | Clarity | Strength | |
| 1 | 3,000 | 3 | 23.3 | 0.1 | 0 | clear | 3 | 63.4 |
| 2 | 3,000 | 20 | 25.7 | 0.1 | 11.5 | clear | 1 | 23.1 |
| 3 | 14,000 | 3 | 25.3 | 0.1 | 0 | clear | 1 | 70.5 |
| 4 | 14,000 | 20 | 25.6 | 0.1 | 9.1 | clear | 1 | 42.2 |
| 5 | 78,000 | 3 | 25.9 | 0.1 | 0 | clear | 2 | 72.1 |
| 6 | 78,000 | 6.5 | 27.1 | 0.05 | 0 | clear | 3 | 63.5 |
| 7 | 78,000 | 10 | 27.6 | 0.1 | 2.3 | clear | 2 | 52.7 |
| 8 | 78,000 | 15 | 26.0 | 0.1 | 3.7 | clear | 3 | 49.4 |
| 9 | 78,000 | 20 | 25.5 | 0.1 | 10.5 | clear | 1 | 44.3 |
| 10 | 100,000 | 0.3 | 14.5 | 0.1 | Did not polymerize | | ND | ND |

ND = Not done

What is claimed is:

1. A wettable, clear, oxygen permeable contact lens prepared from a hydrogel which is the homopolymerization product of
   (a) a precursor polymer or copolymer containing two or more pendant or terminal hydroxyl groups, said precursor polymer or copolymer being the polymerization product of (1) one or more ethylenically unsaturated monomers selected from the group consisting of 2-hydroxyethyl methacrylate, N-vinyl-2-pyrrolidone, N,N-dimethylacrylamide, 2-ethylhexyl acrylate, cyclohexyl methacrylate, 2-hydroxypropyl methacrylate, isobornyl methacrylate, methyl methacrylate, styrene and allyl alcohol;
   reacted with (2) one or more monoisocyanates selected from the group consisting of 2-isocyanatoethyl methacrylate, styrene isocyanate, cyclohexyl isocyanate, m-isopropenyl-α,α-dimethylbenzyl isocyanate and phenyl isocyanate where at least one of the monoisocyanates must contain an ethylenically unsaturated moiety;
   with the proviso that the hydrogel has a percent water content of at least 15%.

* * * * *